Figure 1:
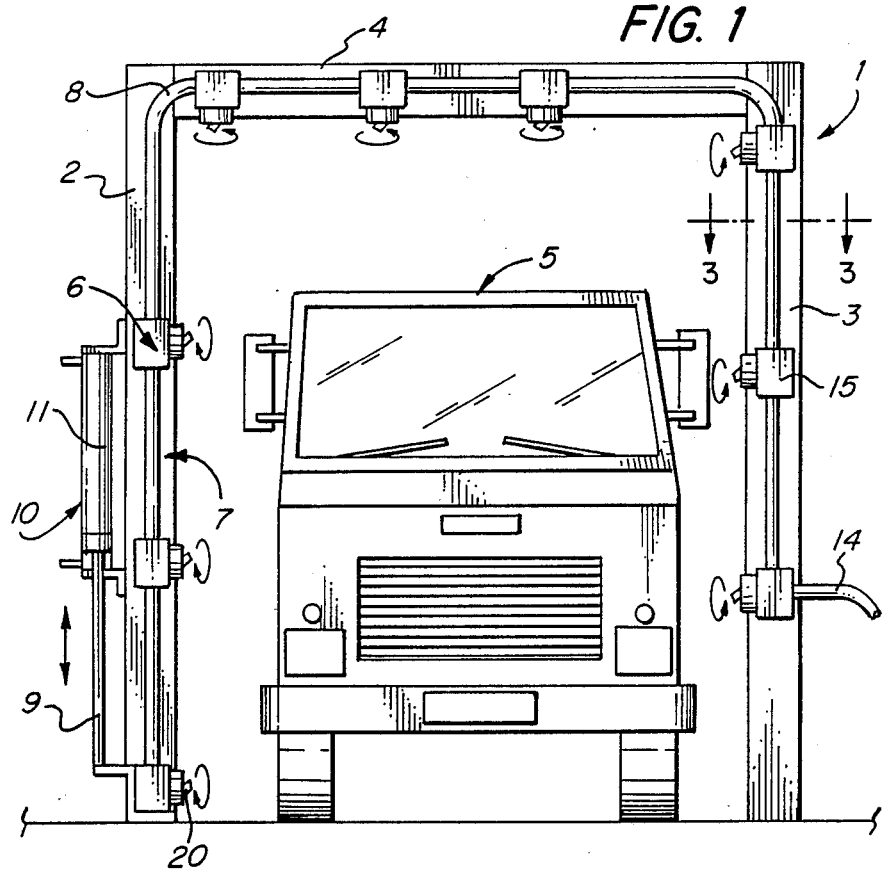

United States Patent [19]

Vetter et al.

[11] Patent Number: 4,920,997
[45] Date of Patent: May 1, 1990

[54] CAR WASHING INSTALLATION

[75] Inventors: Kurt Vetter, Welzheim; Werner Schulze, Winnenden; Jürgen Krautter, Fellbach/Öff.; Kurt Häfner, Murrhardt, all of Fed. Rep. of Germany

[73] Assignee: Alfred Karcher GmbH & Co., Fed. Rep. of Germany

[21] Appl. No.: 340,178

[22] PCT Filed: Oct. 6, 1987

[86] PCT No.: PCT/DE87/00453
§ 371 Date: Apr. 12, 1989
§ 102(e) Date: Apr. 12, 1989

[87] PCT Pub. No.: WO88/02706
PCT Pub. Date: Apr. 21, 1988

[30] Foreign Application Priority Data
Oct. 16, 1986 [DE] Fed. Rep. of Germany ....... 3635213

[51] Int. Cl.$^5$ ................................................. B60S 3/04
[52] U.S. Cl. .................................. 134/57 R; 134/123; 134/181; 239/752
[58] Field of Search ............... 134/45, 57 R, 123, 179, 134/180, 181; 239/752, 240, 263.2, 263.3, 264, 587

[56] References Cited

U.S. PATENT DOCUMENTS

| | | | |
|---|---|---|---|
| 2,732,846 | 1/1956 | Berezny | 134/45 |
| 3,261,369 | 7/1966 | Thiele | 134/123 |
| 3,288,109 | 11/1966 | Smith, Jr. et al. | 134/181 X |
| 3,339,565 | 9/1967 | Williams | 134/123 X |
| 3,368,571 | 2/1968 | Honorof | 134/123 X |
| 3,391,701 | 7/1968 | Richardson et al. | 134/123 |
| 3,400,727 | 9/1968 | Daum et al. | 134/123 X |
| 3,409,030 | 11/1968 | Schmidt | 134/179 X |
| 3,422,827 | 1/1969 | McCulloch | 134/181 X |
| 3,612,077 | 10/1971 | Capro | 134/123 |
| 4,020,857 | 5/1977 | Rendemonti | 134/7 |
| 4,135,533 | 1/1979 | Gall et al. | 134/123 X |
| 4,679,578 | 7/1987 | Miller | 134/123 |
| 4,719,932 | 1/1988 | Burton | 134/123 X |

FOREIGN PATENT DOCUMENTS 1546135 10/1970 Fed. Rep. of Germany .
255245 11/1984 U.S.S.R. .

Primary Examiner—Philip R. Coe
Attorney, Agent, or Firm—Barry R. Lipsitz

[57] ABSTRACT

A car washing installation has several jet nozzles (20) for a cleaning fluid, if necessary mixed with chemical substances, arranged one next to the other transversely to the length of the car and moved past the car in its longitudinal direction. The jet nozzles (20) are designed as rotative nozzles that supply a point contact jet that emerges from the rotative nozzles at a maximum acute angle of about 30° in relation to the axis of rotation of the nozzles. To ensure that all car surfaces are reliably cleaned, even when the car has a rugged surface, characterized by recesses, the jet nozzles (20) can be periodically moved along the profile of the car on a perpendicular plane to the longitudinal axis of the car.

22 Claims, 3 Drawing Sheets

CAR WASHING INSTALLATION

The invention relates to a vehicle washing installation, in particular for vehicles with a very rugged surface, comprising several spray nozzles for a cleaning liquid possibly with chemicals added thereto arranged next to one another transversely to the longitudinal direction of the vehicle along a portal and moved past the vehicle in the longitudinal direction of the vehicle. The spray nozzles are designed as rotor nozzles which deliver one point contact jet each. The point contact jet issues at an acute angle of up to approximately 30 degrees at the most at an incline to the axis of rotation of the rotor nozzles and describes the lateral area of a cone.

Commercial vehicles, in particular vehicles of the building industry and vehicles with irregular bodies cannot be washed with the customary brush washing installations on account of the geometry of the vehicles. Therefore, cleaning with a manually guided high-pressure spraying device is necessary.

Vehicle washing installations are known wherein flat water jets for cleaning the vehicle are generated from spray nozzles mounted on water supply pipes. The cleaning liquid may, for example, be a water vapor mixture (DE-B-3 436 061). Heated or unheated water under high pressure with or without the addition of chemicals may also be used as cleaning liquid. In order to achieve a surface effect with these known cleaning installations, the nozzles are designed as flat jet nozzles with a spray angle of between 15 and 60 degrees. While these solutions produce satisfactory results in the cleaning of vehicle contours with flat surfaces they fail with rugged vehicle contours owing to the deceleration and atomization of the flat jets in air. The range of these flat jets within which effective cleaning can still be achieved is limited to about 0.5 m. At a distance of 1 m from the nozzle, the soiled surface will only be wetted. The mechanical effect originating from the impact pressure and required for the cleaning is not achievable.

A motor vehicle washing installation is known from DE-B-1 806 634 wherein several nozzles are arranged along a portal, each of these carrying at the end of a flexible hose piece on outlet nozzle which can rotate along the lateral area of a cone possibly by means of the repulsion effect and hence generate a rotating cleaning jet. In such an installation, it is necessary to place nozzles of this type very close to each other in order to achieve thorough cleaning of the entire surface of the motor vehicle. Since the above-mentioned nozzles become worn rapidly by the moved hose parts, such an installation requires extraordinarily intensive maintenance. Difficulties may also arise in the cleaning of a rugged surface because if there is an insufficient number of nozzles, there is the possibility that the jet at a certain vehicle height will always hit the surface at a certain angle only and so reliable cleaning is not possible where there are undercuts.

The object of the invention is to propose a vehicle washing installation which may also be used for cleaning vehicles with a very rugged surface.

This object is accomplished, in accordance with the invention, in a vehicle washing installation of the kind described at the beginning by the spray nozzles being movable back and forth along the portal around a vehicle in a plane lying transversely to the longitudinal axis of the vehicle, with the amplitude of the motion of neighbouring spray nozzles being at least so large that the parts of the vehicle over which their point contact jets repeatedly pass adjoin one another.

Point contact jets remain sharply focused over quite a large distance and so even at a distance in the order of magnitude of 1 m or more from the spray nozzle there is still enough impact energy contained in the jet to achieve a reliable cleaning effect.

The point contact jet circulates along the lateral area of a cone and hence reaches quite a large surface area of the vehicle in both a direction lying transversely to the longitudinal axis of the vehicle and a direction lying parallel to the longitudinal axis of the vehicle and so, in all, surface cleaning can be effected. By virtue of the combination with the repeated motion back and forth of the spray nozzles themselves, multiple coverage at different angles of incidence is obtained so that even "blind corners" are fully reached by the cleaning liquid.

When in the following mention is made of "repeatedly movable" this does not mean that the motion in the mathematical sense must be strictly periodic. It is merely essential that a certain surface area be passed over repeatedly by point contact jets. The term "vehicle contour" in the following means the outer contour of the vehicle without taking into account the recesses and crevices. Essentially, two vertical side surfaces as well as the horizontal top side and possibly the horizontal bottom side of the vehicle are to be defined by this. This also corresponds substantially to the configuration of the parts of the portal.

It is advantageous for the direction of the axis of rotation of the spray nozzle to be adjustable. A vehicle washing installation can thereby be adapted to certain vehicles, for example, several point contact jets can be directed at the wheel region of the vehicle while a smaller number of point contact jets is directed at less soiled regions. The cleaning efficiency in the highly soiled wheel region is thereby intensified.

The spray nozzles may be hydrodynamically driven by the cleaning liquid in a manner known per se, for example, the spray nozzles can be designed as turbine rotor or repulsion nozzles. It is also possible for the spray nozzles to be driven by a motor drive, possibly via gear means such as chains or gear wheels.

It is also advantageous for the angle of inclination of the point contact jet to be adjustable relative to the axis of rotation. The apex angle of the cone through which the point contact jet travels can thereby be altered and hence the size of the surface over which the jet passes and the angle of incidence on the surface to be cleaned.

It is particularly advantageous for the spray nozzles to be repeatedly movable back and forth by a common drive.

To this end, provision may, for example, be made for several spray nozzles to be held on a supply pipe for the cleaning liquid which is moved back and forth repeatedly. Such a supply pipe may, for example, simply be a vertical pipe line which is arranged beside the side surface of the vehicle and is moved up and down parallel to its longitudinal direction.

In a further preferred embodiment, provision is made for the supply pipe to extend along the supports and the crossbeam of a portal and to comprise flexible deflection regions in the transition between supports and crossbeam. In these deflection regions, the pipe may be bent, but it can transmit push and pull forces in the longitudinal direction so that the repeated displacement motion can be transmitted to the spray nozzles via this pipe also over the flexible regions.

It is particularly advantageous for the spray nozzles to be adjustable about an axis extending transversely to the longitudinal axis of the vehicle and along the vehicle contour or the portal. The angle of incidence at which the point contact jets strike the vehicle surface is thereby adjustable. It is particularly expedient to provide sensors which respond to the vehicle and actuate via a control means a drive which rotates the spray nozzles about the axis extending transversely to the longitudinal axis of the vehicle and along the vehicle contours or the portal. In this way, the point contact jets can be controlled so that they are first directed at an incline against the vehicle, i.e., hit the front side of the vehicle. Once the vehicle has reached the spray nozzles, the point contact jets are directed onto the side surfaces of the vehicle in a plane lying transversely to the direction of the vehicle. After the vehicle has passed by, the point contact jets are directed in the direction of travel so that the rear side of the vehicle is then hit by the point contact jets. In this way, the vehicle can be completely cleaned all around by spray nozzles arranged at the side of the vehicle.

The spray nozzles may have associated closure valves which are actuatable for individual spray nozzles or groups or spray nozzles so that the supply of liquid over the surface of the vehicle may be partially interrupted, whereby the cleaning efficiency can be increased in other regions.

It is expedient to provide spray nozzles with different openings, for example, spray nozzles with larger openings can be arranged in the lower part of the installation. Greater cleaning efficiency can thereby be achieved in the highly soiled bottom region than in the less soiled body region.

It is also possible to arrange the spray nozzles at different mutual spacings along the vehicle contour or the portal.

The cleaning efficiency can be increased by the point contact jet being of pulsating configuration. When a rotor nozzle is used, provision is preferably made for the pulsation frequency of the point contact jet to be an integral multiple of the rotational speed of the rotor nozzle. The rotation of the rotor nozzle can be used directly to generate the pulsation, for example, by interrupting the supply of liquid to the rotor nozzle within an existing rotary angular region of the rotor nozzle. When the spray nozzles are arranged on a portal, the latter may be inclined relative to a vertical plane arranged transversely to the longitudinal axis of the vehicle so that the cleaning is carried out at different locations throughout the height of the vehicle. This ensures, for example, that dirty liquid running off in the downward direction is reliably removed in the lower region (cf., e.g., US-A-4,135,533, column 4, lines 50 to 55).

Figure 2:
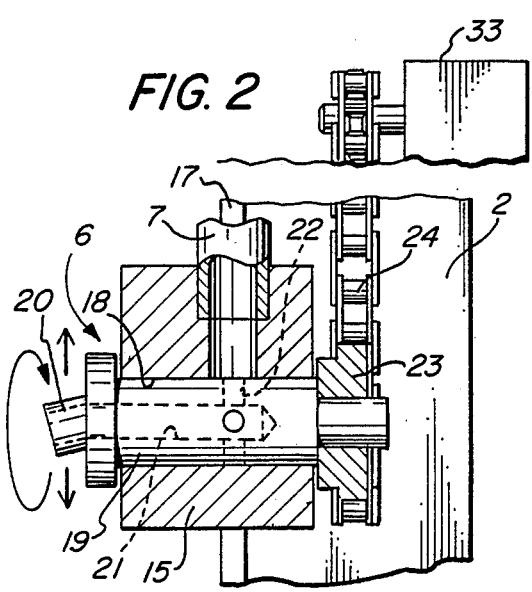
Figure 3:
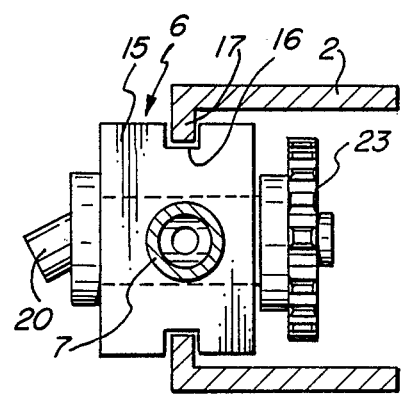
Figure 4:
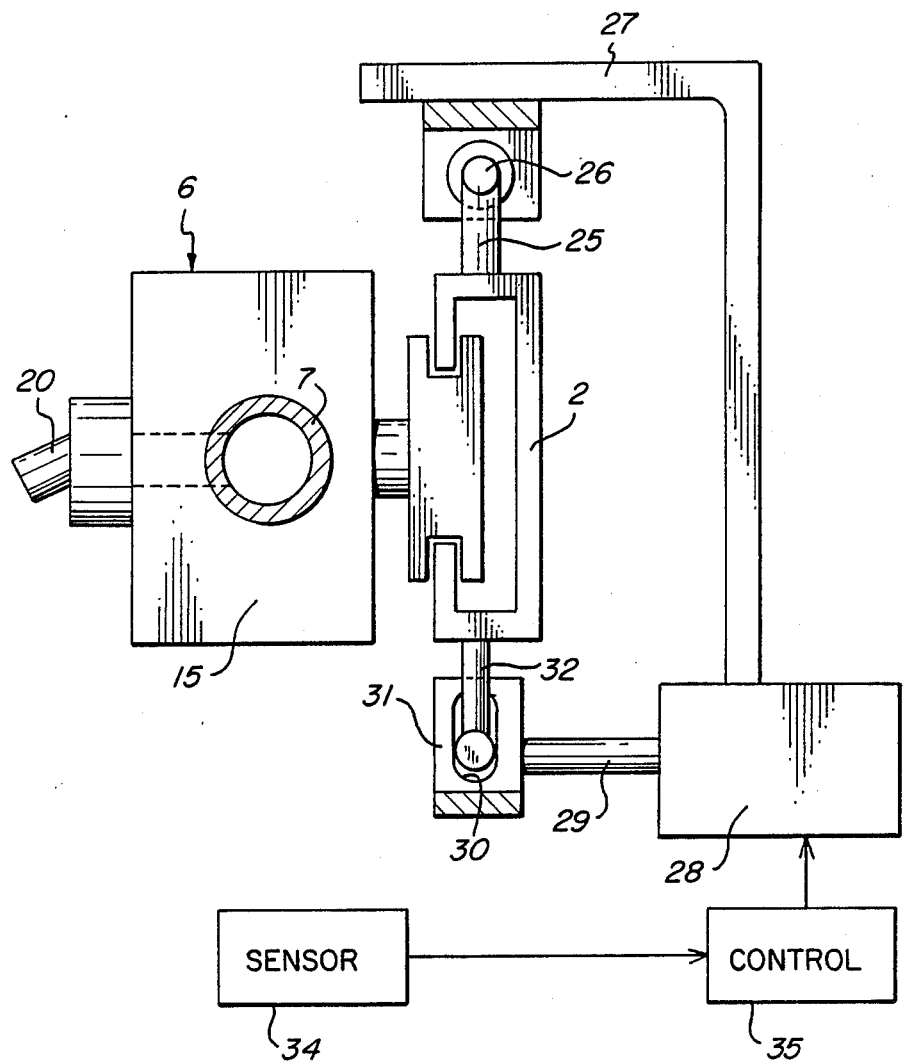
Figure 5:
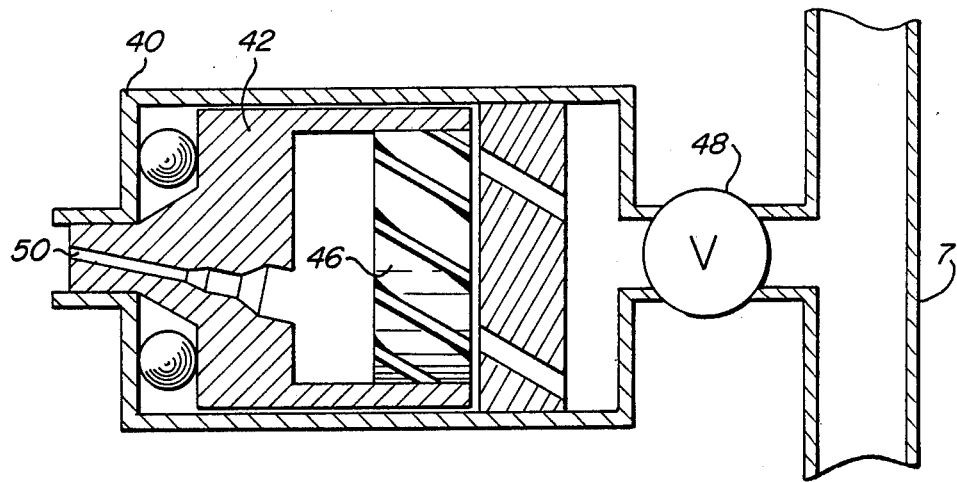
Figure 6:
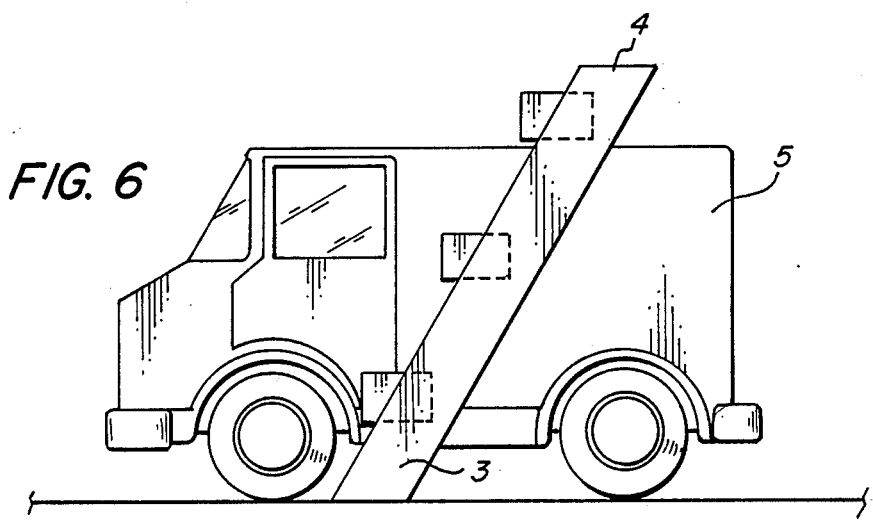

The following description of preferred embodiments serves in conjunction with the drawings to explain the invention in further detail. The drawings show:

FIG. 1—a schematic front view of a portal vehicle washing installation;

FIG. 2—a sectional view through a spray nozzle designed as rotor nozzle according to a first preferred embodiment;

FIG. 3—a sectional view along line 3—3 in FIG. 1;

FIG. 4—a sectional view corresponding to FIG. 3 in a further preferred embodiment of a vehicle washing installation;

FIG. 5—a sectional view through a spray nozzle designed as a rotor nozzle that is driven by the cleaning liquid which is to be sprayed therethrough; and FIG. 6—a sechematic side view of a preferred embodiment of the portal vehicle washing installation of FIG. 1.

The vehicle washing installation illustrated in the drawings comprises a portal 1 with two vertical supports 2 and 3 and a crossbeam 4 joining these at the top. The portal allows passage of a vehicle 5 therethrough. In the illustrated embodiment, the vehicle is represented by a truck; however, a tractor or a similar motor vehicle with a surface having recesses and crevices could also be washed herein.

The portal may be arranged stationarily, the vehicle then passes through underneath the portal; it is also possible for the portal to be of movable design, the vehicle then remains stationary.

On the portal 1, several spray heads 6 are spaced along the supports and along the crossbeam and are displaceably mounted in a guide, not illustrated in FIG. 1, along the support and along the crossbeam, respectively. The spray heads 6 are interconnected by means of a supply pipe 7 for the cleaning liquid to be sprayed by the spray heads. In the region between the spray heads mounted on a support or on the crossbeam, respectively, the supply pipe 7 may be of rigid design, whereas in the region of transition from the supports 2 and 3 to the crossbeam 4, the supply pipe 7 comprises flexible parts 8. In this region, the supply pipe 7 may consist of a high-pressure hose which is indeed flexible but is guided in such a way in a deflection guide, not illustrated in the drawings, that it can transmit push and pull forces in the longitudinal direction.

At least one of the spray heads 6 is connected to the piston 9 of a piston-cylinder unit 10, the cylinder 11 of which is held on the support 2. Upon retraction and extension of the piston 9, the spray head connected to the latter is displaced along the support 2 over the length of the stroke and this motion is transmitted to all of the other spray heads 6 via the supply pipe 7 so that repeated retraction and extension of the piston causes the spray heads to execute a periodic reciprocating motion along the supports and the crossbeam.

The drive by means of the piston-cylinder unit 10 is only one possibility of displacing the spray heads periodically, i.e., repeatedly, along the supports and the crossbeams, respectively, such displacement motion could also be brought about by a chain drive or by other gear means known per se. It is merely essential that the spray heads 6 be repeatedly displaced along the supports and along the crossbeam.

Various motions are possible, the spray heads 6 are preferably moved back and forth in such a way that the regions of the surface of the vehicle 5 to be cleaned which are acted upon by the jets of neighboring spray heads at least ajoin one another, preferably overlap one another. It is also possible to move the spray heads 6 along the entire support first in one direction and then again in the other direction, for example, by means of a paternoster-like guide. The jet issued by a spray head then passes over the entire height of the support or the entire width of the crossbeam, respectively. The spray heads 6 themselves are equipped with a spray nozzle 20 through which the cleaning liquid is delivered in the form of a point contact jet. In order to achieve this, the spray nozzles are supplied with the cleaning liquid by a high-pressure apparatus known per se under high pressure, for example, under a pressure of 100 to 200 bar. The cleaning liquid may be supplied via a flexible hosepipe 14. Chemicals aspirated by the cleaning apparatus, for example, by means of an injector may be admixed with the supplied cleaning liquid.

It is also possible to provide beside the high-pressure spray heads separate spray nozzles for the delivery of chemicals which, if appropriate, are then supplied at a lower pressure.

The spray heads 6 may be designed such that the direction of the nozzle openings and hence the direction of emergence of the point contact jet is adjustable so that, for example, several point contact jets can be concentrated in a heavily soiled region or the point contact jets can be directed at an incline to the direction of travel of the vehicle in order that the surface to be cleaned is acted upon from an inclined front or inclined rear position.

The spray heads themselves are equipped with rotor nozzles, i.e., with nozzles which are arranged on a rotor such that the direction of emergence of the point contact jet includes with the axis of rotation an acute angle in the order of magnitude of between 0 and 30 degrees, preferably 2 and 10 degrees. The point contact jet thus moves along the lateral area of a cone and hits the surface of the vehicle to be cleaned from different directions. This cone-shaped motion together with the translational motion of the spray heads along the supports and the portal result in the surface to be cleaned being passed over several times, with all corners and recesses being efficiently cleaned due to the different angles of the point contact jet relative to the surface to be cleaned.

It is advantageous for the axis of rotation of the spray head to be adjustable. The spray cone can thereby be directed in the desired direction, for example, preferably downwardly or against the direction of the relative motion of vehicle and portal.

Possibilities for implementing this are available to those skilled in the art.

The spray head 6 illustrated in FIGS. 2 and 3 comprises a bearing block 15 which is mounted for displacement along the support 2 by two ledges 17 of the support 2 engaging longitudinal grooves 16. The supply pipe 7 running parallel to the support 2 extends into the bearing block 15 and opens into a horizontal bearing bore 18. A rotor 19 is rotatably mounted in this bearing bore 18 and carries at its free end the spray nozzle 20 which is inclined to the axis of rotation. Located inside the rotor 19 is a coaxial longitudinal bore 21 which communicates with the spray nozzle 20 and in a corresponding angular position is connected via a transverse bore 22 to the supply pipe 7. In other angular positions of the rotor 19 in which the transverse bore 22 is not in alignment with the supply pipe 7, the longitudinal bore 21 is disconnected from the supply pipe 7. As a result of this, pulsating contact point jet is delivered from the nozzle 20 upon rotation of the rotor, i.e., a jet which is switched on and off at high frequency, the frequency being a multiple of the rotational frequency.

In the embodiment illustrated in the drawings, the rotor 19 is rotated via a chain wheel 23 and a chain 24 which is made to circulate in a manner not indicated in detail by a suitable drive, for example, by an electric motor 33. This chain drive may be displaceable together with the spray heads 6 along the support and along the crossbeam, respectively, so that all of the spray heads are driven by a common chain drive.

The spray nozzle designed as rotor nozzle may also be driven by the cleaning liquid which is to be sprayed itself. For example, referring to FIG. 5 spray nozzles 50 are known wherein the cleaning liquid drives a turbine 46 inside the spray head 40 which is connected either directly via rotor 42 or via a gearing (not shown) to the nozzle. Furthermore, rotor nozzles are known wherein the liquid drives the rotor by means of the repulsion principle. In particular, these hydrodynamically driven spray nozzles are suitable for being held with an adjustable axis of rotation on the portal as they can be connected via a flexible delivery pipe to the supply pipe for the cleaning liquid and so there are no difficulties with the transmission of the rotary motion to the differently oriented spray heads.

The spray nozzles 20 may be designed such that their angle of inclination is adjustable relative to the axis of rotation. This is not expressly illustrated in the drawings; here, too, practical possibilities for implementing this are available to one skilled in the art. The apex angle of the cone described by the point contact jet can thereby be adapted to the requirements.

The spacing of the various spray heads from one another may be selected so as to differ along the supports and the crossbeam in accordance with the requirements. The same applies to the openings in the nozzles of the individual spray heads. Furthermore, the individual spray heads may have associated closure valves 48 which are activated for the spray heads individually or in groups so that supply of cleaning liquid can be concentrated on a smaller number of spray heads. All these measures serve to adapt the cleaning efficiency in various regions of the vehicle to the requirements. For example, it is advantageous to concentrate a larger number of point contact jets and to use point contact jets with a larger diameter in the wheel region which is usually more soiled in order to achieve greater cleaning efficiency here.

A modified embodiment is illustrated highly schematically in FIG. 4. The support 2 on which a spray head 6 is mounted for longitudinal displacement in the same manner as in the embodiment of FIGS. 2 and 3 is, in turn, pivotable by a lateral lever 25 about an axis of rotation 26 extending parallel to the support. For this purpose, a frame portion 27 of the portal carries a drive 28 which displaces a piston rod 29 in such a way that a lateral lever 32 of the support 2 which is guided in an elongate hole 30 of a driver 31 is actuated. The entire support 2 is thereby pivoted about the axis of rotation 26 and so the spray heads 6 are also correspondingly pivoted. Such pivoting of the spray heads may be used, for example, to direct the point contact jets against the vehicle in order to achieve particularly good cleaning efficiency.

It is also possible to equip the vehicle washing installation with sensors 34 which detect whether the vehicle is standing beside the portal. Electro-optical, capacitive or mechanical sensors may, for example, be used for this purpose. The signals generated by these sensors may be fed to a control means 35 which directs the point contact jets against the vehicle at the beginning of the cleaning operation so that the point contact jets preferably hit the front of the vehicle. Once the vehicle is standing beside the portal the support 2 is pivoted such that the axes of rotation of the spray heads stand substantially vertical to the direction of travel so that the point contact jets hit the side surfaces approximately vertically. Once the vehicle has passed through the portal the point contact jets are then directed in the direction of travel so that the rear of the vehicle leaving the portal is now hit. Reliable all round cleaning is thus possible.

The embodiment of FIG. 4 represents a possible solution only schematically. Other solutions could, for example, be designed such that the supply pipe 7 itself carrying the spray heads 6 is rotated about its longitudinal axis. This is expedient particularly when the vehicle washing installation is not of portal design but consists essentially of a vertical supply pipe for the liquid with the spray heads mounted thereon. In such an embodiment, the spray heads may be inclined such that they act upon the vehicle not only at the side surface but also at an incline from below and at an incline from above so that the entire vehicle can be cleaned by such an apparatus when such apparatus is installed on either side of the vehicle. Such an apparatus may be mounted on an undercarriage so that an operator can move this apparatus along the vehicle to be cleaned. It is then expedient for the supply pipe equipped with the spray heads to be movable up and down so that simultaneously with the rotor motion of the nozzles a periodic reciprocating motion of the spray heads is also achieved. Such an apparatus may also be movably held on rails on the roof of a building.

In further advantageous embodiments, not illustrated in the drawings, provision may be made for the crossbeam of the portal to be vertically adjustably mounted on the supports. This facilitates adaptation to vehicles with different contours. Furthermore, it is possible to incline the portal relative to the vertical plane standing perpendicularly to the direction of travel such that the crossbeam projects in the direction of travel. In this way, the cleaning can be carried out successively at different heights so that, for example, dirty liquid can run off downwardly and is then reliably removed from the vehicle by the bottom spray heads.

We claim:

1. Vehicle washing installation, in particular for vehicles with a very rugged surface, comprising several spray nozzles for a cleaning liquid possibly with chemicals added thereto arranged next to one another transversely to the longitudinal direction of the vehicle along a portal and moved past said vehicle in the longitudinal direction of said vehicle, said spray nozzles (20) being designed as rotor nozzles which deliver one point contact jet each, said point contact jet issuing at an acute angle of up to approximately 30 degrees at the most at an incline to the axis of rotation of said rotor nozzle and describing the lateral area of a cone, characterized in that said spray nozzles are movable back and forth along the portal around a vehicle in a plane lying transversely to the longitudinal axis of said vehicle, the amplitude of the motion of neighboring spray nozzles (20) being at least so large that the parts of said vehicle (5) over which their point contact jets repeatedly pass ajoin one another.

2. Installation according to claim 1, characterized in that the direction of the axis of rotation of said spray nozzle (20) is adjustable.

3. Installation according to claim 2, characterized in that said spray nozzles are driven hydrodynamically by the cleaning liquid.

4. Installation according to claim 2, characterized in that said spray nozzles (20) are driven by a motor drive.

5. Installation according to claim 2, characterized in that the angle of inclination of said point contact jet is adjustable relative to said axis of rotation.

6. Installation according to claim 1, characterized in that said spray nozzles are driven hydrodynamically by the cleaning liquid.

7. Installation according to claim 6, characterized in that the angle of inclination of said point contact jet is adjustable relative to said axis of rotation.

8. Installation according to claim 1, characterized in that said spray nozzles (20) are driven by a motor drive.

9. Installation according to claim 8, characterized in that the angle of inclination of said point contact jet is adjustable relative to said axis of rotation.

10. Installation according to claim 1, characterized in that the angle of inclination of said point contact jet is adjustable relative to said axis of rotation.

11. Installation according to claim 1, characterized in that said spray nozzles (20) are repeatedly movable back and forth by a common drive (11; 24).

12. Installation according to claim 11, characterized in that several spray nozzles (20) are held on a supply pipe (7) for the cleaning liquid which is repeatedly moved back and forth.

13. Installation according to claim 12, characterized in that said supply pipe (7) extends along the supports (2, 3) and the crossbeam (4) of a portal (1) and comprises flexible deflection regions (8) in the transition between said supports (2,3) and said crossbeam (4).

14. Installation according to claim 1, characterized in that said spray nozzles (20) are adjustable about an axis extending transversely to the longitudinal axis of said vehicle and along the portal.

15. Installation according to claim 14, characterized in that sensors responding to said vehicle (5) are provided to actuate via a control means a drive (28) which rotates said spray nozzles (20) about the axis extending transversely to the longitudinal axis of said vehicle and along the portal.

16. Installation according to claim 1, characterized in that said spray nozzles (20) have associated closure valves which are actuatable for individual spray nozzles or groups of spray nozzles.

17. Installation according to claim 1, characterized in that spray nozzles (20) with different size openings are provided.

18. Installation according to claim 17, characterized in that spray nozzles (20) with larger openings are arranged in the bottom part of said installation.

19. Installation according to claim 1, characterized in that said spray nozzles (20) are arranged at different mutual spacings along the portal.

20. Installation according to claim 1, characterized in that said point contact jet is of pulsating configuration.

21. Installation according to claim 20, characterized in that when a rotor nozzle is used, the pulsation frequency of said point contact jet is an integral multiple of the rotational speed of said rotor nozzle.

22. Installation according to claim 1, characterized in that when said spray nozzles (20) are arranged on a portal (1), the latter is inclined relative to a vertical plane arranged transversely to the longitudinal axis of said vehicle.

* * * * *